(12) United States Patent
Agarwal et al.

(10) Patent No.: US 9,984,028 B2
(45) Date of Patent: May 29, 2018

(54) REDUNDANCY FOR PORT EXTENDER CHAINS

(71) Applicant: Brocade Communications Systems, Inc., San Jose, CA (US)

(72) Inventors: Bipin Agarwal, San Jose, CA (US); Arijit Bhattacharyya, San Jose, CA (US); Chandra Konathala Poorna, San Jose, CA (US); Suresh Nulu, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 159 days.

(21) Appl. No.: 14/926,822

(22) Filed: Oct. 29, 2015

(65) Prior Publication Data

US 2016/0124884 A1 May 5, 2016

Related U.S. Application Data

(60) Provisional application No. 62/073,832, filed on Oct. 31, 2014.

(51) Int. Cl.
*G06F 13/00* (2006.01)
*G06F 13/36* (2006.01)
(Continued)

(52) U.S. Cl.
CPC .......... *G06F 13/4045* (2013.01); *G06F 13/16* (2013.01); *G06F 13/362* (2013.01);
(Continued)

(58) Field of Classification Search
CPC ... H04L 41/0806; H04L 45/10; H04L 12/462; H04L 45/583; G06F 13/4045
(Continued)

(56) References Cited

U.S. PATENT DOCUMENTS 6,480,473 B1 * 11/2002 Chambers ............... H04L 41/00
370/253
6,657,951 B1 * 12/2003 Carroll .................. H04L 12/433
370/222

(Continued)

FOREIGN PATENT DOCUMENTS

CN     102726006 A    10/2012
CN     103795518 A     5/2014
(Continued)

OTHER PUBLICATIONS

International Search Report and Written Opinion for International Appln. No. PCT/US2015/058258 dated Feb. 16, 2016, 11 pages.
Chinese Office Action dated Sep. 4, 2017, 5 pages.

*Primary Examiner* — Faisal M Zaman
(74) *Attorney, Agent, or Firm* — Stewart M. Wiener

(57) ABSTRACT

Techniques implementing redundancy in an extended bridge comprising a controller bridge (CB) unit and a plurality of port extender (PE) units are provided. In one embodiment, the CB unit can receive join requests from the plurality of PE units and can determine, based on the join requests, whether the plurality of PE units are physically connected to the CB unit and/or other CB units in the extended bridge according to a ring topology. If the plurality of PE units are physically connected to the CB unit or the other CB units according to a ring topology, the CB unit can select a link in the ring topology as being a standby link.

15 Claims, 6 Drawing Sheets

(51) Int. Cl.
*G06F 15/173* (2006.01)
*G06F 13/40* (2006.01)
*G06F 13/16* (2006.01)
*G06F 13/362* (2006.01)
*H04L 1/22* (2006.01)
*H04L 12/40* (2006.01)

(52) U.S. Cl.
CPC .......... H04L 1/22 (2013.01); H04L 12/40013 (2013.01); *H04J 2203/0042* (2013.01)

(58) Field of Classification Search
USPC .......................... 710/306, 316; 709/223, 226
See application file for complete search history.

(56) References Cited

U.S. PATENT DOCUMENTS

| | | | | |
|---|---|---|---|---|
| 6,760,838 | B2* | 7/2004 | Owen | G06F 15/177 709/250 |
| 2005/0238006 | A1* | 10/2005 | Taylor | H04L 41/0806 370/389 |
| 2007/0242604 | A1* | 10/2007 | Takase | H04J 3/14 370/223 |
| 2008/0275975 | A1* | 11/2008 | Pandey | H04L 49/40 709/223 |
| 2009/0196202 | A1* | 8/2009 | Fujii | H04L 12/437 370/254 |
| 2009/0216973 | A1* | 8/2009 | Nakajima | G06F 11/1451 711/162 |
| 2009/0290486 | A1* | 11/2009 | Wang | H04L 12/437 370/222 |
| 2010/0257283 | A1* | 10/2010 | Agarwal | H04L 63/08 709/250 |
| 2011/0222396 | A1* | 9/2011 | Tochio | H04L 12/437 370/222 |
| 2012/0099423 | A1* | 4/2012 | Wang | H04L 12/43 370/222 |
| 2013/0100808 | A1* | 4/2013 | Doron | H04L 47/125 370/235 |
| 2013/0322457 | A1* | 12/2013 | Budhia | H04L 49/253 370/401 |
| 2014/0003428 | A1* | 1/2014 | Li | H04L 12/56 370/390 |
| 2014/0156906 | A1* | 6/2014 | Babu | G06F 13/4027 710/316 |
| 2014/0254347 | A1* | 9/2014 | Xie | H04L 12/437 370/218 |
| 2015/0078392 | A1* | 3/2015 | Yan | H04L 49/3054 370/410 |
| 2015/0138950 | A1* | 5/2015 | Ma | H04L 1/22 370/223 |
| 2015/0339249 | A1* | 11/2015 | Dharmadhikari | G06F 13/4221 710/316 |
| 2015/0372911 | A1* | 12/2015 | Yabusaki | H04L 67/34 709/226 |
| 2016/0036688 | A1* | 2/2016 | Wang | H04L 45/583 370/254 |
| 2016/0191311 | A1* | 6/2016 | Wang | H04L 41/0889 370/392 |

FOREIGN PATENT DOCUMENTS

| | | |
|---|---|---|
| CN | 103856398 A | 6/2014 |
| CN | 103873374 A | 6/2014 |
| EP | 2670090 A1 | 12/2013 |
| EP | 2685676 A1 | 1/2014 |

* cited by examiner

REDUNDANCY FOR PORT EXTENDER CHAINS

CROSS-REFERENCES TO RELATED APPLICATIONS

The present application claims the benefit and priority under U.S.C. 119(e) of U.S. Provisional Application No. 62/073,832, filed Oct. 31, 2014, entitled "REDUNDANCY FOR PORT EXTENDER CHAINS." The entire contents of this provisional application are incorporated herein by reference for all purposes.

BACKGROUND

As known in the field of computer networking, a stacking system or stack is a group of physical network devices that are connected together (via, e.g., external cables) to operate as a single, logical network device. Each member network device of a stack is referred to as a unit and includes (1) stacking ports for connecting to other units in the same stack, and (2) data ports for connecting to upstream/downstream hosts and/or networks.

A stacking system that supports IEEE 802.1BR port extender technology (referred to as an extended bridge) is composed of two types of units: controlling bridge (CB) units and port extender (PE) units. The CB units provide control and management plane functions for the extended bridge. For example, each CB unit may be a L2 switch or L2/L3 router with appropriate management plane components (e.g., management CPU, etc.). The CB units may be connected to each other via their stacking ports according to a linear or ring topology, thereby forming a core stack.

In contrast to CB units, each PE unit simply provides physical data port termination for the extended bridge. For example, each PE unit may be a L2 switch with X number of physical data ports, which appear as virtual data ports on the CB unit to which the PE unit is connected. Since PE units do not need to perform any management plane functionality, such units are typically less complex, and thus lower in cost, than CB units.

Under the existing 802.1BR standard, groups of PE units (referred to as PE chains) can connect to CB units as linear sub-stacks or trees. For example, FIG. 1 depicts an example extended bridge 100 comprising two CB units CB1 and CB2. A PE chain 102 is connected as a linear sub-stack to CB1, where PE chain 102 includes PE units PE1, PE2, PE3, PE4, and PE5 (daisy chained in that order from CB1). Each stacking link between PE units or between a PE unit and a CB unit comprises an uplink port (i.e., a port that provides connectivity towards a CB unit) and a cascade port (i.e., a port that provides connectivity down the PE chain). Thus, in the example of FIG. 1, the port on the CB1 side of link 104 is a cascade port while the port on the PE1 side of link 104 is an uplink port. Similarly, the port on the PE1 side of link 106 is a cascade port while the port on the PE2 side of link 106 is an uplink port. The data ports of each PE unit (i.e., the ports that connect to other LAN components) are referred to as extended ports.

One problem with the linear sub-stack configuration shown in FIG. 1 is that, if there is a link or unit failure along PE chain 102, several of the PE units can become non-operational. For instance, assume there is a link failure between PE units PE2 and PE3 in extended bridge 100. In this scenario, PE3, PE4, and PE5 will lose connectivity with CB1. If each PE unit includes 48 data ports, this will result in 48×3=144 data ports going out of service, which can cause significant disruption to the network environment in which the extended bridge is deployed.

The link failure scenario above can be mitigated to an extent by forming trunks (also known as link aggregation groups, or LAGs) comprising multiple physical ports/links between PE units PE1-PE5 and between CB unit CB1 and PE unit PE1. With such trunks in place, even if there is a failure of one physical link, data can continue to flow along the PE chain through the remaining active physical links. However, trunking does not address unit failures (i.e., failures that cause an entire PE unit to go down). For example, if PE unit PE2 fails or otherwise becomes non-operational, PE3-PE5 will lose connectivity with CB1, regardless of any trunking between those units.

SUMMARY

Techniques implementing redundancy in an extended bridge comprising a CB unit and a plurality of PE units are provided. In one embodiment, the CB unit can receive join requests from the plurality of PE units and can determine, based on the join requests, whether the plurality of PE units are physically connected to the CB unit and/or other CB units in the extended bridge according to a ring topology. If the plurality of PE units are physically connected to the CB unit or the other CB units according to a ring topology, the CB unit can select a link in the ring topology as being a standby link.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Figure 1:
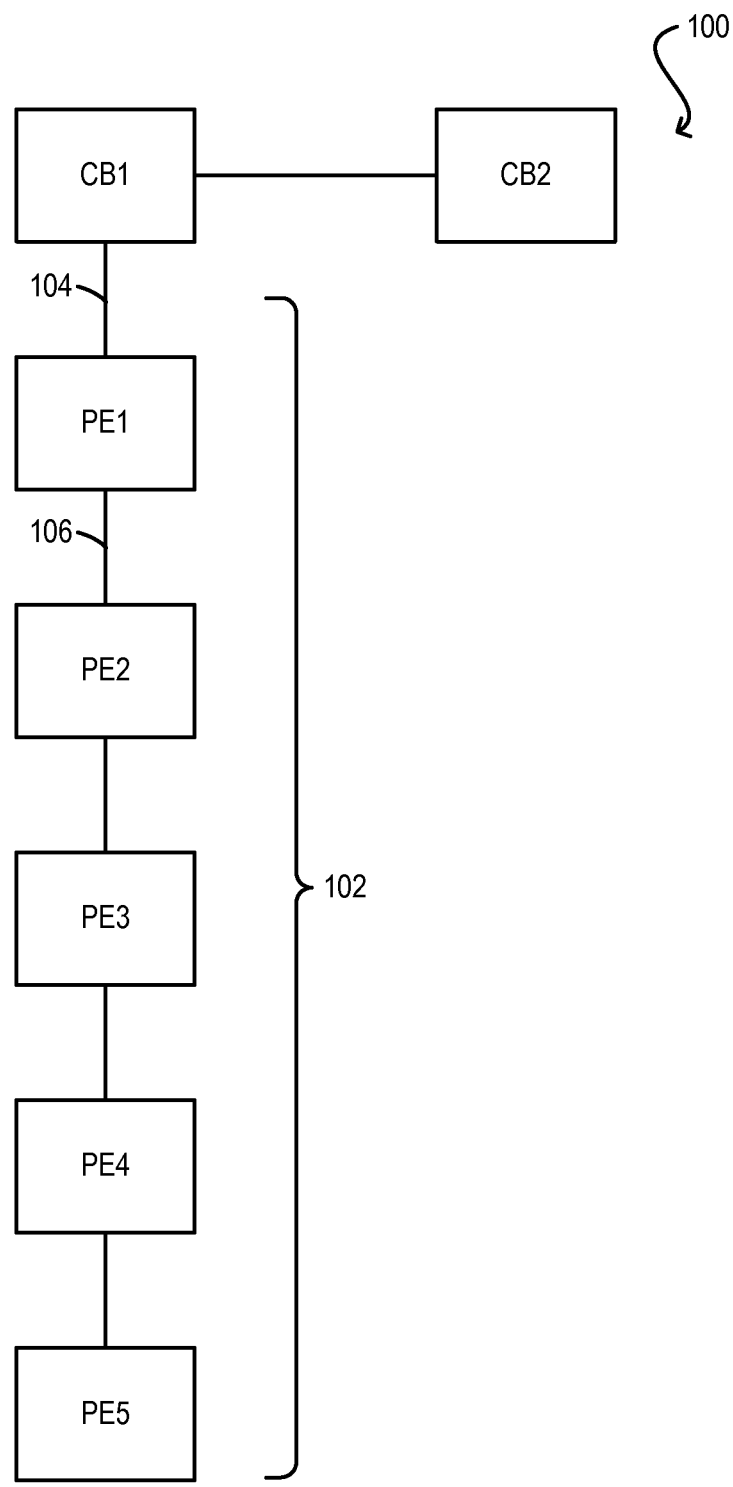
FIG. 1 depicts an example extended bridge.
Figure 2:
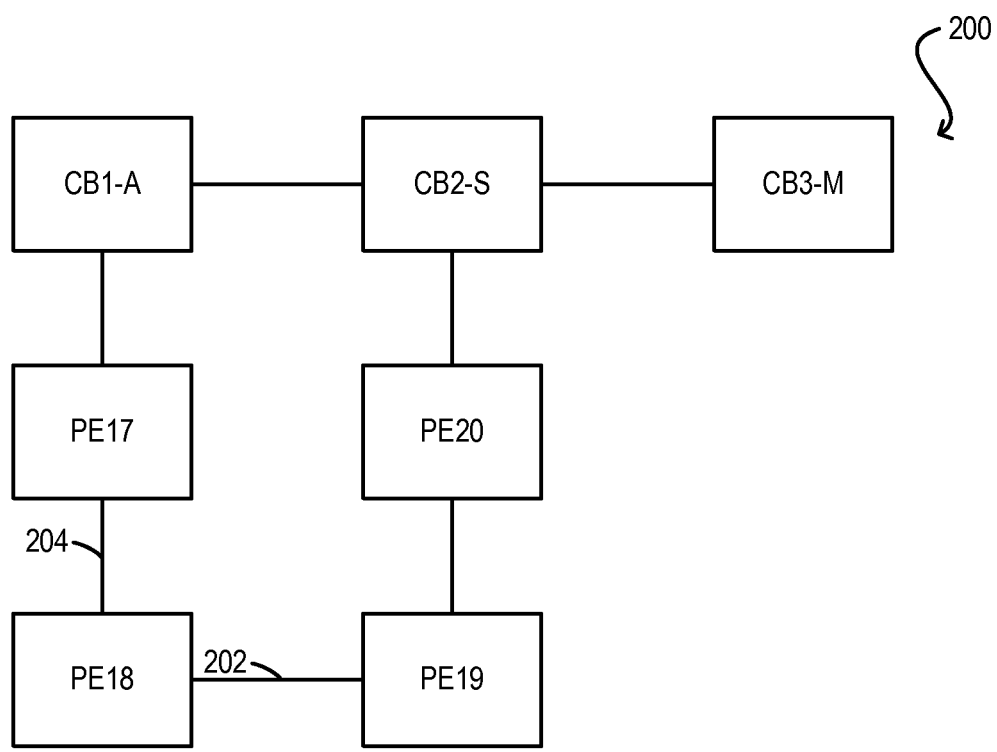
FIG. 2 depicts an extended bridge with a physical PE ring topology according to an embodiment.

Embodiments of the present disclosure provide techniques for implementing redundancy in an extended bridge comprising a chain of PE units connected to a core stack of CB units. At a high level, these techniques involve physically connecting the PE chain to the core stack as a ring (rather than as a linear sub-stack), such that one end of the PE chain is connected to one CB unit in the core stack and the other end of the PE chain is connected to another CB unit in the core stack. For example, FIG. 2 depicts an extended bridge 200 with CB units CB1-A, CB2-S, and CB3-M and a PE chain comprising PE units PE17, PE18, PE19, and PE20 according to an embodiment. CB1-A is the active CB unit in bridge 200, while CB2-S is a standby CB unit and CB3-M is a member CB unit. As shown, PE17 is physically connected to CB1-A and PE20 is physically connected to CB2-S, thereby creating a ring topology for the PE chain.

Upon detecting the existence of the physical ring described above, a CB unit of the extended bridge (e.g., the active CB unit) can convert the ring into one or more logical, linear PE chains. For example, in FIG. 2, active CB unit CB1-A can convert the ring comprising PE units PE17-PE20 into a first logical linear chain including PE17 and PE18 and a second logical linear chain including PE19 and PE20. To achieve this, CB1-A can mark/select link 202 between PE18 and PE19 (i.e., the link connecting the two logical chains) as being a standby link, such that no internal bridge traffic is passed along link 202. As used herein, "internal bridge traffic" refers to traffic that is tagged with a header (e.g., an ETAG header) that is understood only by the CB and PE units. The CB unit can then send a message to each PE unit to program their hardware tables in accordance with the determined logical PE chains, and can store information regarding the ring topology and the logical PE chains in one or more local data structures (e.g., a topology database and a ring table). In this way, the extended bridge can be configured to carry out its normal runtime operations based on this logical topology.

At a later point in time, the CB unit may detect a port, link, or unit failure with respect to one of the units in the extended bridge. In response to this failure, the CB unit can leverage the physical ring structure of the bridge and can automatically rearrange the bridge's logical topology in order to ensure that each PE unit still has connectivity to the core stack. For example, returning to the scenario above where link 202 of FIG. 2 is selected to be a standby link, if a port or link failure subsequently occurs on link 204 connecting PE17 and PE18, CB1-A can reconfigure the logical topology such that PE17 forms a first PE chain (connected to CB1-A) and PE18-PE20 form a second PE chain (connected to CB2-S). This can involve, inter alia, changing link 202 from a standby link to an active (i.e., operational) link, changing link 204 to be the new standby link, and reprogramming the affected PE units (in this case, PE18 and PE19) to reflect the changes. With this reconfiguration of the logical topology, PE units PE17-PE20 can continue to communicate with at least one CB unit in the core stack, even though link 204 has gone down.

These and other aspects of the present disclosure are described in further detail in the sections that follow.

2. PE Unit Join and Logical PE Chain Creation

Figure 3A:
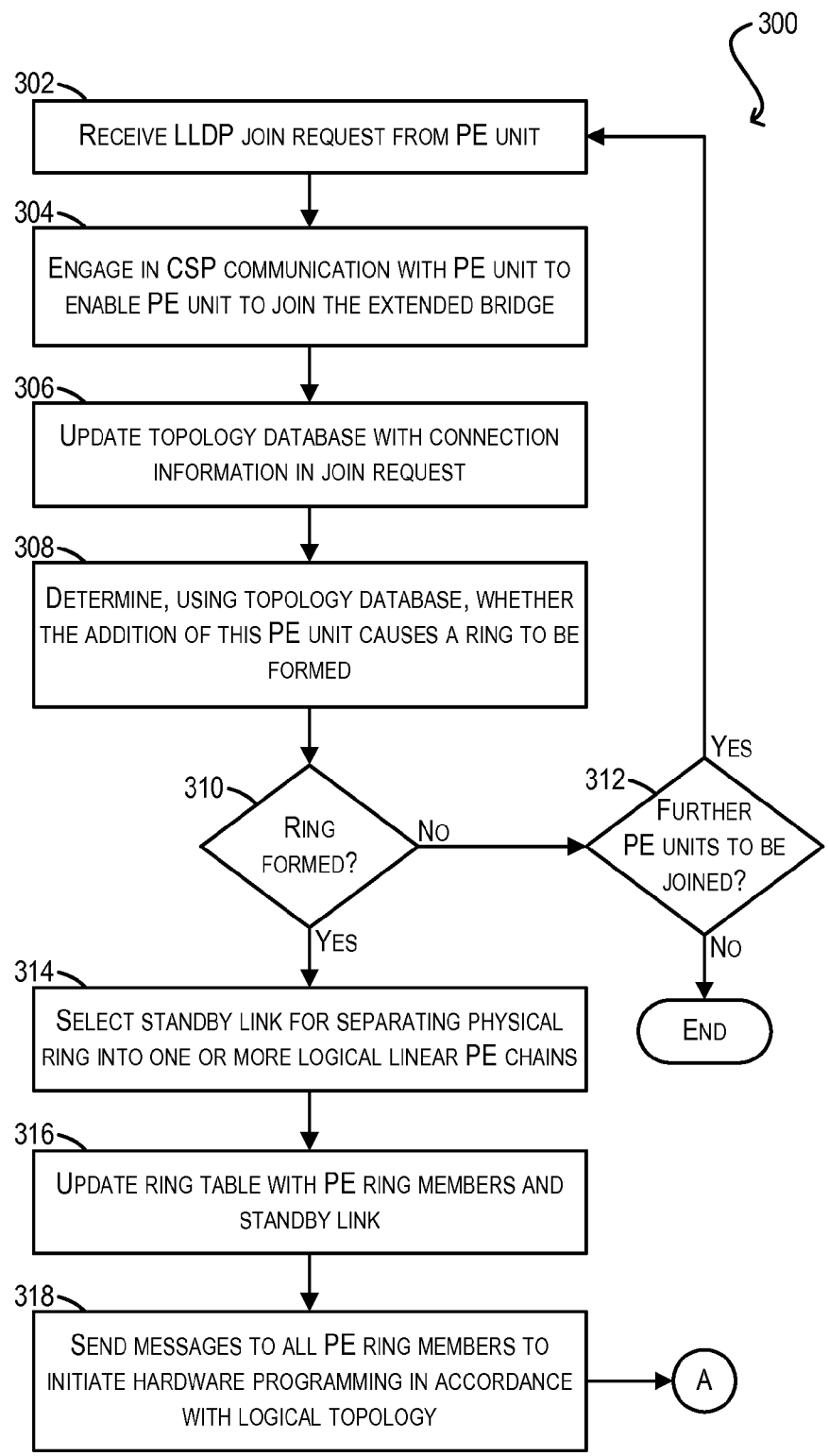
FIGS. 3A and 3B depict a workflow for handling PE unit joins and creating logical PE chains according to an embodiment.
Figure 3B:
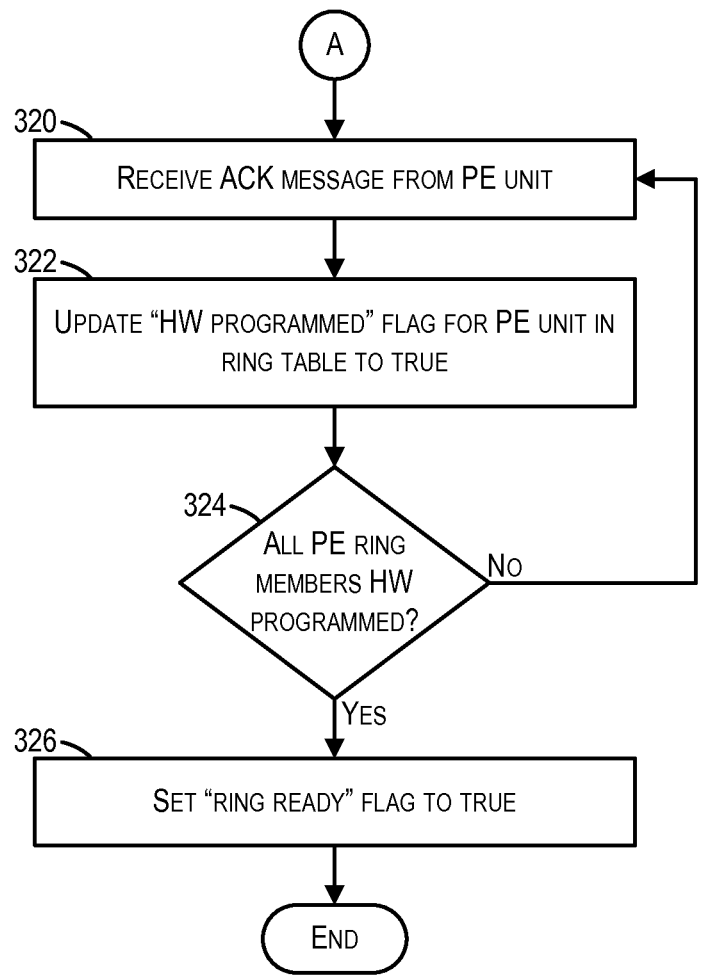

FIGS. 3A and 3B depict a workflow 300 that can be performed by a CB unit in an extended bridge (e.g., CB1-A of FIG. 2) at the time one or more PE units attempt to join the extended bridge according to an embodiment. Workflow 300 assumes that the PE units are physically connected to the bridge's core stack as a ring, like the example of FIG. 2. With workflow 300, the CB unit can detect the existence of the physical ring and can convert the ring into one or more logical, linear PE chains.

Starting with block 302 of FIG. 3A, the CB unit can receive a join request (formatted according to, e.g., the Link Layer Discovery Protocol, or LLDP) from a PE unit that wishes to join the extended bridge. The join request can include connection information for the PE unit, such as port(s) through which the unit is connected and authentication metadata. The join request can also include vendor-specific information, such as the type/model of the unit, the image version it is running, and so on.

It is assumed that each PE unit sends one join request out of each non-data port (e.g., cascade or uplink port) of the device. Thus, in extended bridge 200 of FIG. 2, PE17 will send one join request out of its port connected to CB1-A and another join request out of its port connected to PE18 (towards CB2-S). It is also assumed that that if a PE unit receives a join request from another PE unit (e.g., PE18 receives a join request from PE17), that PE unit will forward the join request towards the core stack if it has already joined the extended bridge. If the receiving PE unit has not yet joined the extended bridge, the PE unit will first attempt to join the bridge by sending join requests out of its non-data ports before forwarding on the received join request.

At block 304, in response to receiving the join request, the CB unit can establish a Control and Status Protocol (CSP) session with the PE unit and can communicate with the PE unit via this session in order to carry out the join process per the 802.1BR standard.

At block 306, the CB unit can update a local topology database with the connection information included in the join request received at block 302. For example, the CB unit can store information regarding the particular port and/or link on which the join request was sent, which indicates how this PE unit is physically connected to the core stack. In this way, the CB unit can keep track of the overall physical topology of the extended bridge.

Further, at block 308, the CB unit can determine, using the topology database, whether the addition of this new PE unit causes a ring to be formed in the physical topology. If no ring has been formed (block 310), the CB unit can monitor for additional join requests from other PE units (block 312) and can loop back to block 302. If all connected PE units have joined the bridge and no ring has been formed, workflow 300 can end.

However, if the CB unit determines that a ring has been formed at block 310, the CB unit can select one link in the physical ring to act as a standby link for separating the ring into one or more logical, linear PE chains. For instance, in the example of FIG. 2, CB1-A may select link 202 between PE18 and PE19 as being a standby link, thereby splitting the ring into a first logical linear chain comprising PE17 and PE18 and a second logical linear chain comprising PE19 and PE20. As mentioned previously, a link that is selected to be a standby link will not forward any internal (e.g., ETAG-wrapped) bridge traffic within the bridge. There are various techniques that the CB unit can employ to select the standby link, such as selecting the last link that has joined the ring, selecting the link that splits the ring into evenly-sized chains, and so on. One of ordinary skill in the art will recognize other variations, modifications, and alternatives.

Then, at blocks 316 and 318, the CB unit can update a local ring table with information regarding the PE units that compose the ring (along with other information, such as the selected standby link), and can send a message to each PE ring member to perform hardware programming in accordance with the determined logical linear chains. In this way, each PE ring member can be configured to operate based on this logical topology.

In one embodiment, the ring table can comprise one entry per PE ring member, with the following fields:
PE unit ID
HW programmed flag (true/false)
Ring member flag (true/false)
Ring ready flag (true/false)
Standby link (port1-port2)
The HW programmed flag can indicate whether this PE unit has been programmed in hardware according to the logical PE chains determined at block 314. Generally speaking, this flag will be initialized to false and then updated to true once an acknowledgement message is received from the PE unit indicating that the hardware programming has been successfully completed (discussed with respect to FIG. 4 below). The ring member flag can indicate whether this PE unit is part of a physical ring (will be initialized to true at block 316). The ring ready flag can indicate whether this ring of PE units is ready to support redundancy in the face of PE port/link/unit failures (i.e., whether all links/units in the ring are operational and are hardware programmed). And the standby link field can identify the standby link determined at block 314. Since the ring ready and standby link fields will generally contain the same values for every PE ring member, in certain embodiments they may be maintained within the ring table entry of a single PE ring member (e.g., the PE unit with the lowest ID).

The HW programming messages that are transmitted by the CB unit to each PE ring member at block 318 can comprise information indicating what the uplink port and cascade port should be for that unit (based on the logical PE chains determined at block 314), in addition to how to forward data packets based on their E-Channel IDs (ECIDs). For example, with respect to extended bridge 200 of FIG. 2, assume that CB1-A selects link 202 as the standby link, thereby splitting the ring into one logical linear chain with PE17 and PE18 and another logical linear chain with PE18 and PE20. Further assume the following port connections in bridge 200 (note that the value x in port identifier x/y/z corresponds to the CB/PE ID):

1/1/1 to 17/2/1
17/2/3 to 18/2/3
18/2/1 to 19/2/1
19/2/3 to 20/2/3
20/2/1 to 2/1/1

In this scenario, the following information may be programmed into the hardware of each PE unit:

PE17
Uplink port: 17/2/1 (toward CB1-A)
Cascade port: 17/2/3 (toward PE18)
For all ECIDs directed to PE17, forwarding port will be corresponding data (i.e., extended port) on PE17
For all ECIDs directed to PE18, forwarding port will be 17/2/3
For all ECIDs directed to PE19, forwarding port will be 17/2/3
For all ECIDs directed to PE20, forwarding port will be 17/2/3
PE18
Uplink port: 18/2/3 (toward CB1-A)
Cascade port: none
For all ECIDs directed to PE18, forwarding port will be corresponding data (i.e., extended port) on PE18
For all ECIDs directed to PE17, forwarding port will be 18/2/3
For all ECIDs directed to PE19, forwarding port will be 18/2/1
For all ECIDs directed to PE20, forwarding port will be 18/2/1
PE19
Uplink port: 19/2/3 (toward CB2-S)
Cascade port: none
For all ECIDs directed to PE19, forwarding port will be corresponding data (i.e., extended port) on PE19
For all ECIDs directed to PE17, forwarding port will be 19/2/1
For all ECIDs directed to PE18, forwarding port will be 19/2/1
For all ECIDs directed to PE20, forwarding port will be 19/2/3
PE20
Uplink port: 20/2/1 (toward CB2-S)
Cascade port: 20/2/3 (toward PE19)
For all ECIDs directed to PE20, forwarding port will be corresponding data (i.e., extended port) on PE20
For all ECIDs directed to PE17, forwarding port will be 20/2/3
For all ECIDs directed to PE18, forwarding port will be 20/2/3
For all ECIDs directed to PE19, forwarding port will be 20/2/3

In addition to the above, CB1-A can also program itself and the other members of the core stack (CB2-S and CB3-M) as follows:

Cascade ports: 1/1/1 and 2/1/1
Virtual ports (VPs) for PE17 and PE18 created on 1/1/1
VPs for PE19 and PE20 created on 2/1/1
Note that all created VPs can be replicated on all CB units in core stack Turning now to FIG. 3B (which continues workflow 300 from FIG. 3A), after sending out the HW programming messages to the PE ring members at block 318, the CB unit can receive an acknowledgement message from a PE unit indicating that the programming on that unit has been successfully completed (block 320). In response, the CB unit can update the HW programmed flag for that PE unit's entry in the ring table to true (block 322) and can check whether all PE ring members have been HW programmed (block 324). If not, workflow 300 can return to block 320 to wait for acknowledgment messages from the other ring members.

On the other hand, if the CB unit determines that all PE ring members have been HW programmed at block 324, the CB unit can set the ring ready flag in the ring table to true (block 326). This indicates that hardware programming is complete and the PE ring members are ready to provide redundancy in the case of a PE port/link/unit failure. The extended bridge can then begin its normal forwarding operations and workflow 300 can end.

3. Handling a PE Port/Link Failure

The end result of workflow 300 is that PE units in the physical ring topology will join the extended bridge, but one link in the ring will be in "standby" mode and thus block internal bridge traffic (resulting in a logical topology comprising two separate linear PE chains). As mentioned previously, in one embodiment, the CB unit executing workflow 300 can simply select the first link that it determines will cause a ring to be formed as being a standby link. In other embodiments, the CB unit can select a particular link to be a standby link based on certain factors, such as balancing load among the active links in the ring. In this latter case, a simple load balancing algorithm is to divide PE ring members into two chains carrying approximately the same load.

Figure 4:
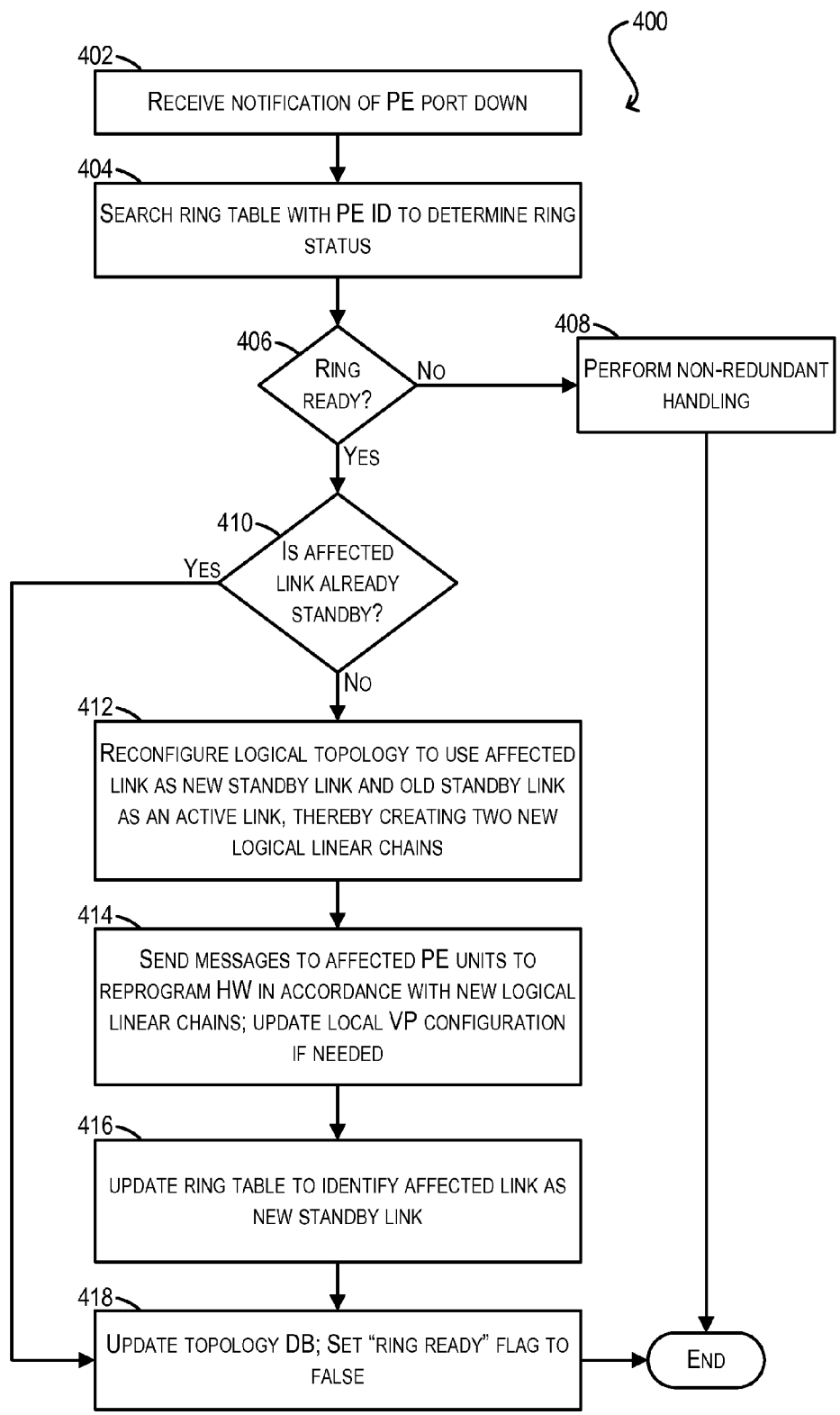
FIG. 4 depicts a workflow for handling a PE port/link failure according to an embodiment.

When any of the PE ports or links in the bridge subsequently fail, one or more CB units in the bridge (e.g., CB1-A of FIG. 2) can automatically reconfigure the logical topology and thereby ensure that each operational PE unit still has connectivity to the core stack. FIG. 4 depicts a flowchart 400 for carrying out this processing according to an embodiment.

At block 402, the CB unit can receive a notification of a PE port down event. The failed port may be a physical port or a logical port (e.g., a LAG). In the latter case, the port down notification will typically be generated only when all of the physical ports in the LAG have gone down.

At block 404, the CB unit can search its ring table with the PE ID of the PE unit affected by the port down event in order to determine the status of the ring to which the PE unit belongs. If the ring ready flag is set to false (indicating that redundancy cannot be provided) (block 408), the CB unit can perform non-redundant handling of the failure (block 408) and workflow 400 can end.

If the ring ready flag is determined to be true at block 408, the CB unit can further check whether the PE link affected by the port down event is the standby link for the ring (block 410). If so, the CB unit can simply update its topology database to indicate that the port/link is down and set the ring ready flag to false (block 418). Note that there is no need to perform any further steps in this scenario because the affected/failed link is already in standby state and thus is not being used in the logical topology.

However, if the affected/failed link is not currently the standby link for the ring, the CB unit can reconfigure the logical topology to mark the affected/failed link as the standby link and to mark the old standby link as now being active (block 412). In this manner, the CB unit can create two new logical, linear PE chains that are not impacted by the port/link failure.

At block 414, the CB unit can send messages to the affected PE ring members to reprogram their respective hardware in accordance with the new logical PE chains created/determined at block 412, and can update its local virtual port (VP) configuration if needed. The CB unit can also update its ring table to identify the affected/failed link as the new standby link (block 416).

Finally, at block 418, the CB unit can update the topology database to reflect the current connectivity in the physical topology, set the ring ready flag for the ring to false (since the ring cannot support any further redundancy if a second port/link failure occurs), and workflow 400 can end.

The end result of workflow 400 is that each operational PE unit in the ring will still have connectivity to the core stack. The only difference is that the logical topology of the bridge will have changed to use the affected/failed link as the standby link (possibly resulting in different logical PE chains). Generally speaking, this reconfiguration should not require any changes to the unit IDs or ECIDs assigned to the PE units; these IDs can remain the same, regardless of how the PE units are logically attached to the core stack.

It should be appreciated that workflows 300 and 400 of FIGS. 3A, 3B, and 4 are illustrative and not intended to limit embodiments of the present disclosure. For example, while workflows 300 and 400 assume that one link in the physical ring of PE units is initially placed in standby mode, in alternative embodiments no operational links are made standby links. Instead, the available data ports on each PE unit are divided into two sets, and the first set is supported by the first non-data link of the PE unit, while the second set is supported by the second non-data link of the PE unit. In these embodiments, if the path via one link to the core stack fails, the ports supported by that link can be changed to the other link, thereby providing a complete path to the core stack.

Further, while workflows 300 and 400 are described as being performed by a single CB unit in the core stack (e.g., the active/master unit), in alternative embodiments this processing can be handled by multiple CB units. In these embodiments, each CB unit can maintain a local copy of the topology database and the ring table, which is synchronized across the core stack.

4. Example Failure Scenarios

This section lists various possible PE port/link failure scenarios with respect to extended bridge 200 of FIG. 2 and the changes that may be made to the configuration of the CB units and PE units of bridge 200 in order to handle these failures in accordance with workflow 400 of FIG. 4. This section relies on the same port connections described in Section 2 and assumes that link 202 (between 18/2/1 and 19/2/1) is initially selected to be the standby link.

Figure 5:
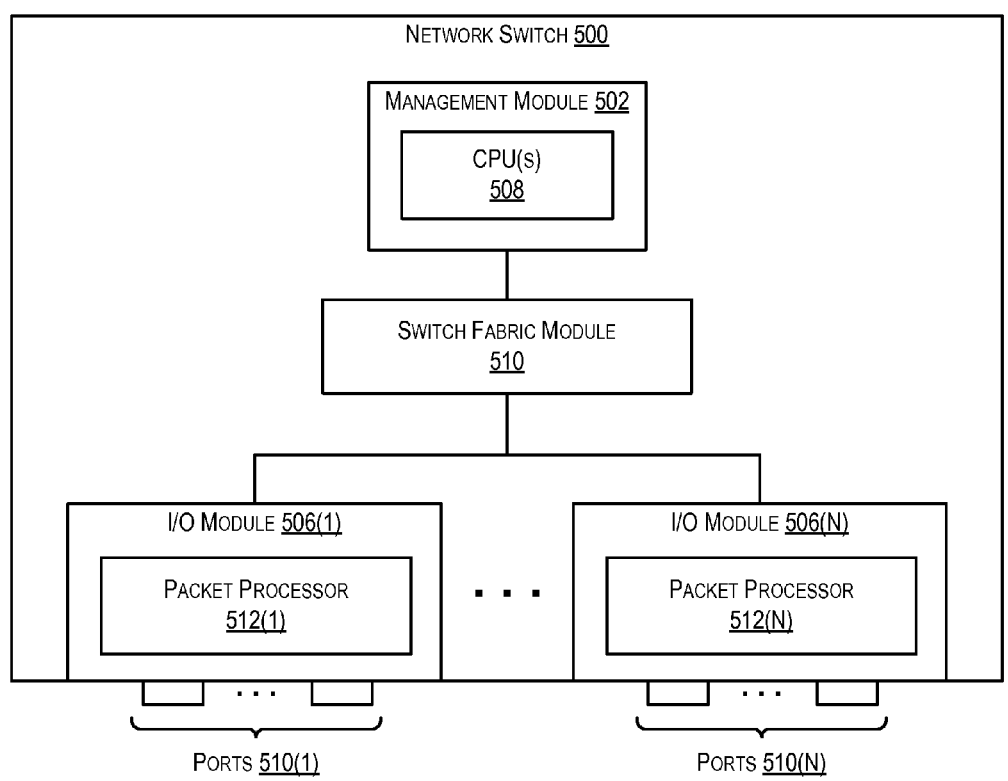
FIG. 5 depicts a network switch according to an embodiment.

One of ports 1/1/1 or 17/2/1 goes down
    PE ring is converted into a single logical linear PE chain comprising PE units PE20, PE19, PE18, PE17
    Port 17/2/1 is no longer set to be an uplink port
    Port 17/2/3 becomes an uplink port and 18/2/3 becomes a cascade port
    Port 18/2/1 becomes an uplink port and 19/2/1 becomes a cascade port
    VPs for PE17 and PE18 move from 1/1/1 to 2/1/1
    Link 1/1/1-17/2/1 becomes the new standby link and the ring ready flag is set to false
    The topology database is updated to reflect the current physical topology One of ports 17/2/3 or 18/2/3 goes down
    PE ring is divided into two logical linear PE chains: one consisting of just PE17, and another consisting of PE20, PE19, PE18
    Port 18/2/1 becomes an uplink port and port 19/2/1 becomes a cascade port
    VPs for PE 18 move from 1/1/1 to 2/1/1
    Link 17/2/3-18/2/3 becomes the new standby link and the ring ready flag is set to false
    The topology database is updated to reflect the current physical topology One of ports 18/2/1 or 19/2/1 goes down
    Link 18/2/1-19/2/1 remains the standby link and the ring ready flag is set to false
    The topology database is updated to reflect the current physical topology One of ports 19/2/3 or 20/2/3 goes down
    PE ring is divided into two logical linear PE chains: one consisting of just PE20, and another consisting of PE17, PE18, PE19
    Port 19/2/1 becomes an uplink port and port 18/2/1 becomes a cascade port
    VPs for PE19 move from 2/1/1 to 1/1/1
    Link 19/2/3-20/2/3 becomes the new standby link and the ring ready flag is set to false
    The topology database is updated to reflect the current physical topology One of ports 20/2/1 or 2/1/1 goes down
    PE ring is converted into a single logical linear PE chain comprising PE units PE17, PE18, PE19, PE20
    Port 20/2/1 is no longer set to be an uplink port
    Port 20/2/3 becomes an uplink port and 19/2/3 becomes a cascade port
    Port 19/2/1 becomes an uplink port and 18/2/1 becomes a cascade port
    VPs for PE19 and PE20 move from 2/1/1 to 1/1/1
    Link 20/2/1-2/1/1 becomes the new standby link and the ring ready flag is set to false
    The topology database is updated to reflect the current physical topology 5. Network Switch FIG. 5 depicts an example network switch 500 according to an embodiment. Network switch 500 can be used to implement any of the CB or PE units described in the foregoing disclosure.

As shown, network switch 500 includes a management module 502, a switch fabric module 504, and a number of I/O modules 506(1)-506(N). Management module 502 represents the control plane of network switch 500 and thus includes one or more management CPUs 508 for managing/controlling the operation of the device. Each management CPU 508 can be a general purpose processor, such as a PowerPC, Intel, AMD, or ARM-based processor, that operates under the control of software stored in an associated memory (not shown).

Switch fabric module 504 and I/O modules 506(1)-506(N) collectively represent the data, or forwarding, plane of network switch 500. Switch fabric module 504 is configured to interconnect the various other modules of network switch 500. Each I/O module 506(1)-506(N) can include one or more input/output ports 510(1)-510(N) that are used by network switch 500 to send and receive data packets. As noted previously, ports 510(1)-510(N) can comprise data ports for communicating with other LAN components, as well as stacking ports for communicating with other units in the same extended bridge. Each I/O module 506(1)-506(N) can also include a packet processor 512(1)-512(N). Each packet processor 512(1)-512(N) is a hardware processing component (e.g., an FPGA or ASIC) that can make wire speed decisions on how to handle incoming or outgoing data packets.

It should be appreciated that network switch 500 is illustrative and not intended to limit embodiments of the present invention. Many other configurations having more or fewer components than switch 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method performed by a controller bridge (CB) unit in an extended bridge, the method comprising:
   receiving, by the CB unit, join requests from a plurality of port extender (PE) units;
   determining, by the CB unit based on the join requests, whether the plurality of PE units are physically connected to the CB unit or other CB units in the extended bridge according to a ring topology; and
   upon determining that the plurality of PE units are physically connected to the CB unit or the other CB units according to a ring topology;
   selecting a link in the ring topology as being a standby link, the standby link separating the ring topology into:
      a first logical PE chain including PE units between a first endpoint of the standby link and the CB unit or other CB units, and
      a second logical PE chain including PE units between a second endpoint of the standby link and the CB unit or the other CB units; and
   transmitting a message to the each of the plurality of PE units, the message including instructions for programming hardware of the PE unit in accordance with the first logical PE chain if the PE unit is part of the first logical PE chain, or in accordance with the second logical PE chain if the PE unit is part of the second logical PE chain.

2. The method of claim 1 wherein the standby link does not forward traffic internal to the extended bridge.

3. The method of claim 1 further comprising:
   updating a ring table local to the CB unit to include:
      an indication of the selected standby link;
      a first flag that is initialized to false; and
      an entry for each of the plurality of PE units, each entry comprising a second flag that is initialized to false.

4. The method of claim 1 wherein the message includes instructions for setting an uplink port, a cascade port, and one or more forwarding ports of the PE unit.

5. The method of claim 3 further comprising:
   receiving, from each of the plurality of PE units, an acknowledgement message indicating that the hardware for the PE unit has been successfully programmed;
   setting the first flag in the ring table to true; and
   setting the second flag in each entry of the ring table to true.

6. The method of claim 5 further comprising, upon detecting a port down event with respect to a first PE unit in the plurality of PE units:
   checking whether the first flag in the ring table is set to true; and
   if the first flag is set to true:
      determining a link affected by the port down event; and
      checking whether the affected link is the standby link.

7. The method of claim 6 further comprising, if the affected link is the standby link:
   setting the first flag in the ring table to false.

8. The method of claim 6 further comprising, if the affected link is not the standby link:
   updating the ring table to indicate that the affected link is now the standby link, thereby creating one or more new logical linear PE chains;
   setting the first flag in the ring table to false; and
   sending a message to each of the plurality of PE units that includes instructions for programming the hardware of the PE unit in accordance with the one or more new logical linear PE chains.

9. The method of claim 8 further comprising, if the affected link is not the standby link:
   updating a local virtual port (VP) configuration of the CB unit in accordance with the one or more new logical linear CB chains.

10. The method of claim 8 further comprising, if the affected link is not the standby link:

updating a local topology database of the CB unit to indicate that the affected link is nonoperational.

11. The method of claim 1 wherein the CB unit is a master or active unit in the extended bridge.

12. A non-transitory computer readable storage medium having stored thereon program code executable by a controller bridge (CB) unit in an extended bridge, the program code causing the CB unit to:
- receive join requests from a plurality of port extender (PE) units;
- determine, based on the join requests, whether the plurality of PE units are physically connected to the CB unit or other CB units in the extended bridge according to a ring topology; and
- upon determining that the plurality of PE units are physically connected to the CB unit or the other CB units according to a ring topology;
  - select a link in the ring topology as being a standby link, the standby link separating the ring topology into:
    - a first logical PE chain including PE units between a first endpoint of the standby link and the CB unit or other CB units, and
    - a second logical PE chain including PE units between a second endpoint of the standby link and the CB unit or the other CB units; and
  - transmit a message to the each of the plurality of PE units, the message including instructions for programming hardware of the PE unit in accordance with the first logical PE chain if the PE unit is part of the first logical PE chain, or in accordance with the second logical PE chain if the PE unit is part of the second logical PE chain.

13. The non-transitory computer readable storage medium of claim 12 wherein the standby link does not forward traffic internal to the extended bridge.

14. A network device operable to act as a controller bridge (CB) unit in an extended bridge, the network device comprising:
- a processor; and
- a memory having stored thereon program code executable by the processor, the program code causing the processor to:
  - receive join requests from a plurality of port extender (PE) units;
  - determine, based on the join requests, whether the plurality of PE units are physically connected to the network device or other CB units in the extended bridge according to a ring topology; and
  - upon determining that the plurality of PE units are physically connected to the network device or the other CB units according to a ring topology;
    - select a link in the ring topology as being a standby link, the standby link separating the ring topology into:
      - a first logical PE chain including PE units between a first endpoint of the standby link and the CB unit or other CB units, and
      - a second logical PE chain including PE units between a second endpoint of the standby link and the CB unit or the other CB units; and
    - transmit a message to the each of the plurality of PE units, the message including instructions for programming hardware of the PE unit in accordance with the first logical PE chain if the PE unit is part of the first logical PE chain, or in accordance with the second logical PE chain if the PE unit is part of the second logical PE chain.

15. The network device of claim 14 wherein the standby link does not forward traffic internal to the extended bridge.

* * * * *